Sept. 4, 1945.    E. J. BALLINTINE    2,384,067
TANK CONSTRUCTION
Filed Nov. 19, 1943    3 Sheets-Sheet 1
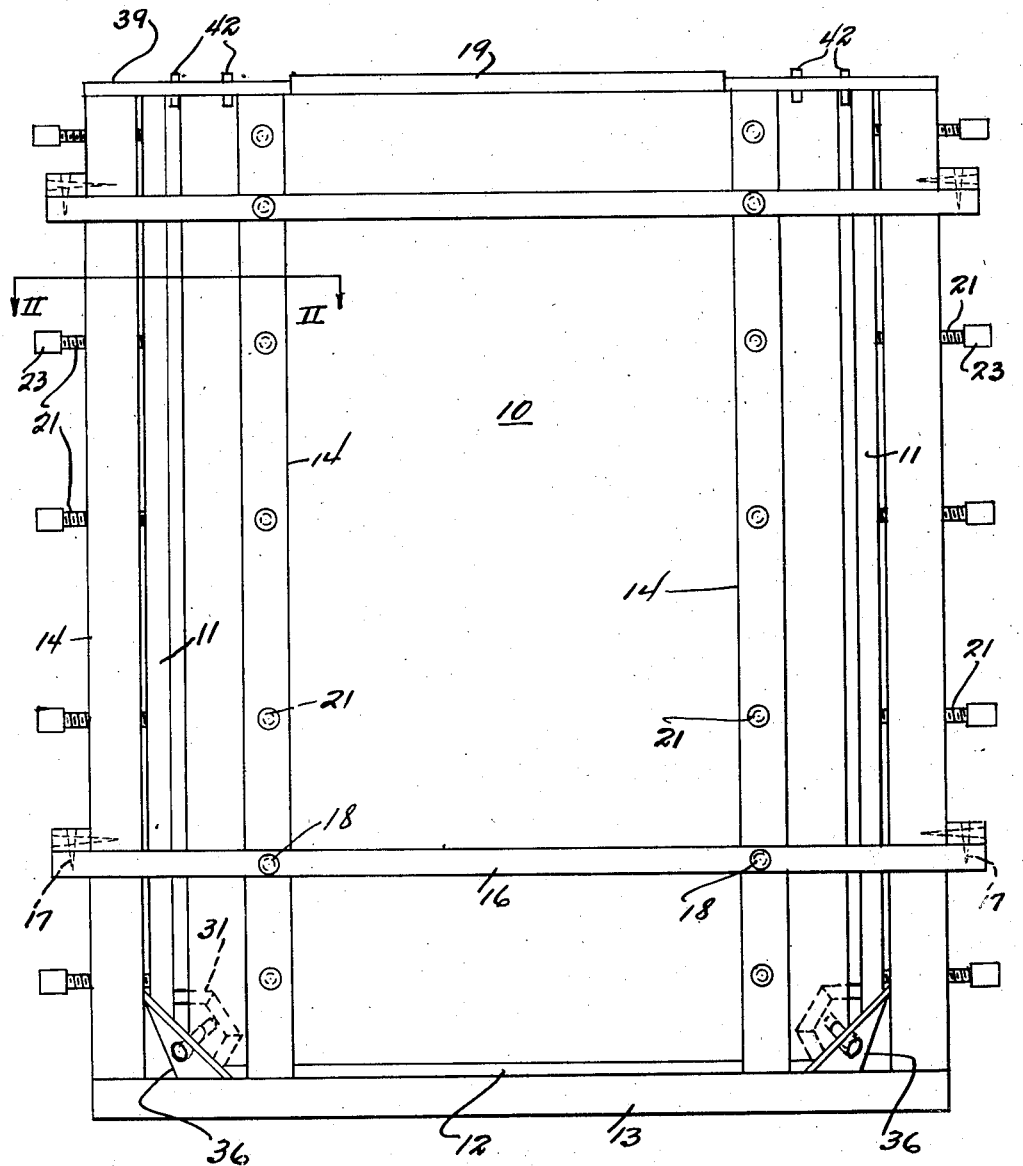
INVENTOR.
ELMER J. BALLINTINE
BY
Olen E. Bee
ATTORNEY

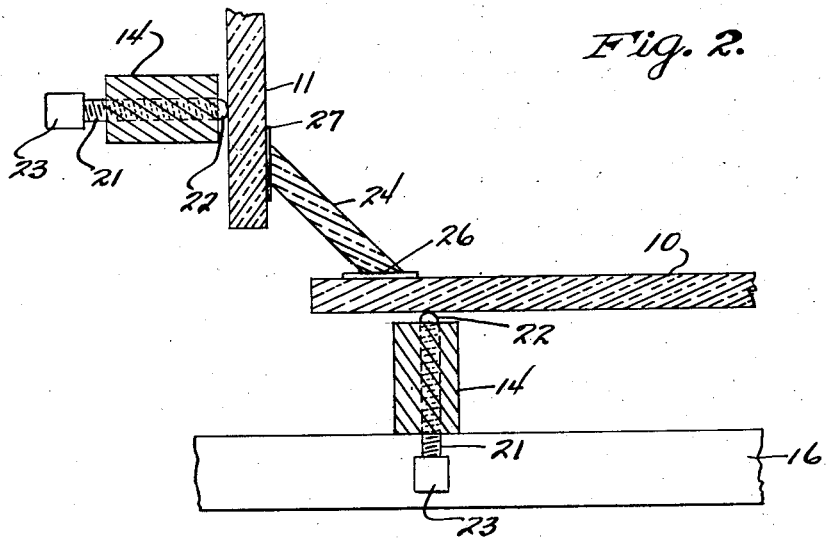
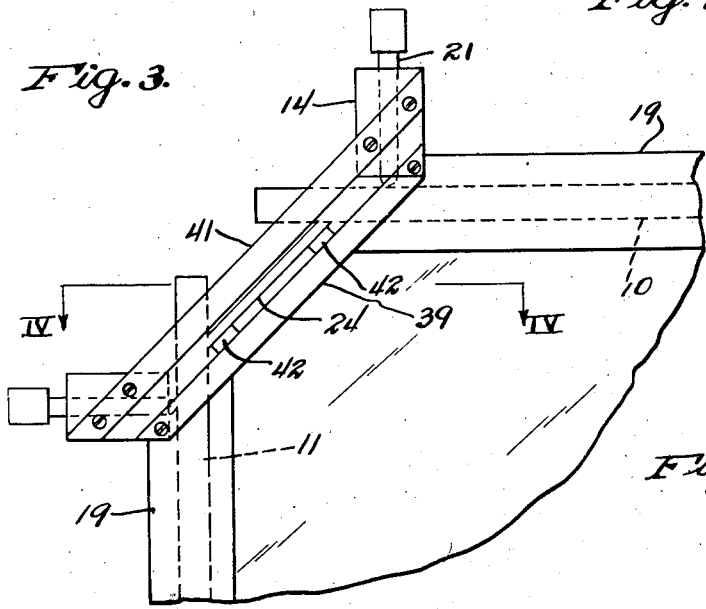
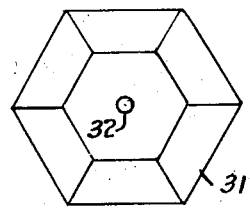
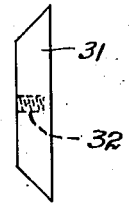

Inventor
ELMER J. BALLINTINE
Olen E. Bee
Attorney

Patented Sept. 4, 1945

2,384,067

UNITED STATES PATENT OFFICE 2,384,067

TANK CONSTRUCTION

Elmer J. Ballintine, Tarentum, Pa., assignor to Pittsburgh Plate Glass Company, Allegheny County, Pa., a corporation of Pennsylvania Application November 19, 1943, Serial No. 510,933

3 Claims. (Cl. 206—2)

The present invention relates to the construction of tanks or containers for substances which are of corrosive nature or which are easily contaminated by contact with surfaces of many of the conventional construction materials, and it has particular relation to tanks or containers assembled from plates of glass.

One object of the invention is to provide improved means for sealing the joints of tanks or containers of the foregoing type.

A second object is to provide improved means for accurately and permanently aligning or plumbing the glass plates employed in the construction of the tanks or containers.

These and other objects of the invention will be apparent from consideration of the following specification and the appended claims.

It has heretofore been proposed to construct tanks or containers of relatively large size from heavy plates of glass set up in such manner as to provide side walls. The glass of course is highly resistant to most chemical agencies and is therefore very durable, does not contaminate the contents of the tanks and is easily cleaned. However, considerable difficulty has been experienced in providing effective seals at the corners between adjoining plates. Furthermore, it is somewhat difficult accurately and permanently to align the plates with respect to each other.

In accordance with the provisions of the present invention it is proposed to obviate the foregoing difficulties:

Firstly, by providing seals for the corners of the tanks consisting of narrow strips or bars of glass having edges accurately ground to fit the contiguous faces of the side walls so that liquids are sealed from escape and the hydraulic pressure of the contents of the tanks operate to press the sealing strips into close contact with the contiguous faces of the glass plates;

Secondly, it is proposed to provide upright columns constituting supporting elements for the exterior of the glass plates against the hydraulic pressure of the contents, which uprights are provided with through bolts having points adjustably engaging the outer faces of the glass plates to permit accurate alignment of the latter in any desired position in order to obtain close and accurate fit with the beveled edges of the sealing strips.

For a better understanding of the invention reference may now be had to the accompanying drawings in which like numerals refer to like parts throughout and in which Fig. 1 is an elevational view of a tank constructed in accordance with the provision of the invention.

Fig. 2 is a sectional view taken substantially upon the line II—II of Fig. 1.

Fig. 3 is a fragmentary plan view of a corner of the construction shown in Fig. 1.

Figs. 7 and 8 are detailed views of the sealing element at the junctures of angles between two side walls and the bottom of a container.

Figure 4:
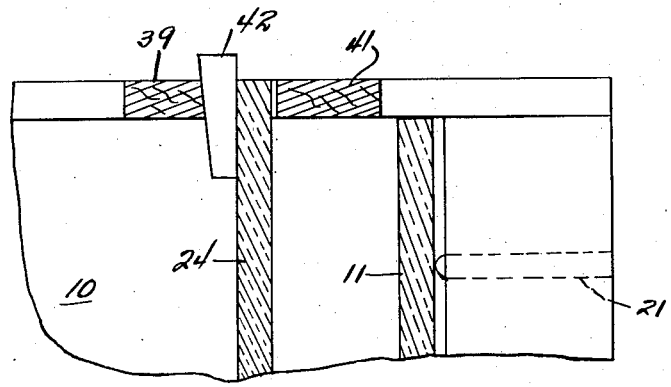
Fig. 4 is a sectional view taken substantially upon the line IV—IV in Fig. 3.

In a container constructed in accordance with the provisions of the invention side walls 10 and 11 of relatively heavy glass, e. g., ½ inch in thickness are arranged in suitable angular relation with respect to each other and preferably rest upon a similar glass bottom plate 12. These glass plates may be either ordinarily annealed glass or glass which has been tempered by sudden chilling while heated to the softening point, in order to increase the strength and resilience thereof. The art of tempering glass plates is well understood and need not be further described. The bottom plate 12 may be supported upon a suitable platform 13 or it may be supported by suitably spaced blocks of glass which have been accurately leveled in order to obtain sufficient bearing of all blocks with the under-surface of the plate 12.

The side walls 10 and 11 are maintained in vertical position by means of a framework, which includes vertical columns 14 upon base 13 and being secured together by horizontal bars 16. The platform and framework may be of wood, reinforced concrete, steel, or any other appropriate material. The horizontal bars preferably are secured together at the corners of the construction by screws 17 or other suitable fastening devices and screws are employed as indicated at 18 to secure the bars to the columns 14. As many columns and transverse bars, as the size of the tank may dictate, can be employed. For purposes of simplicity only a minimum number are shown in the drawings. The upper edges of the glass plates 10 and 11 may be suitably protected by wooden coping bars 19.

As best shown in Fig. 2, the vertical edges of plates 10 and 11 do not meet or abut, but are substantially spaced to allow for movements of the plates and for other purposes. The plates are maintained in spaced relationship with respect to the inner faces of the columns 14 by screw devices 21, preferably of wood and having rounded ends 22 bearing against the outer faces of the glass plates 10 and 11. These wooden screws or bolts may be provided with handles 23 by means of which they can be rotated to force the plates inwardly in a direction normal to the plates or to obtain bearing contacts of the ends of the screws with the plates.

The angles are sealed by means of sealing strips 24, preferably also of plate glass and having the edges thereof beveled as indicated at 26. These beveled edge portions should be accurately ground to an exact fit with the inner surfaces of the glass plates 10 and 11. Accurate adjustment of the plates 10 and 11, to obtain perfect contact with the beveled portions of the strips 24, is facilitated by adjustment of the screws 21. If desired the beveled edges 26 may bear against sealing gaskets 27 of rubber or other relatively inert but elastic material. The use of sealing cements at the joints is also contemplated.

Figure 6:
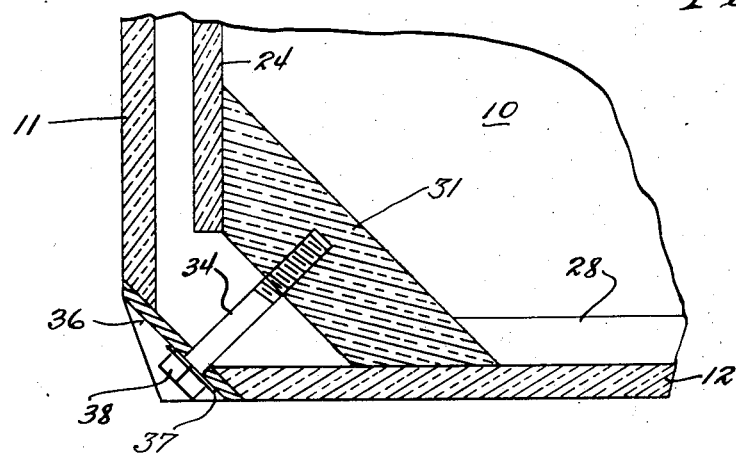
Fig. 6 is a fragmentary sectional view taken substantially upon the line VI—VI of Fig. 5.
Figure 5:
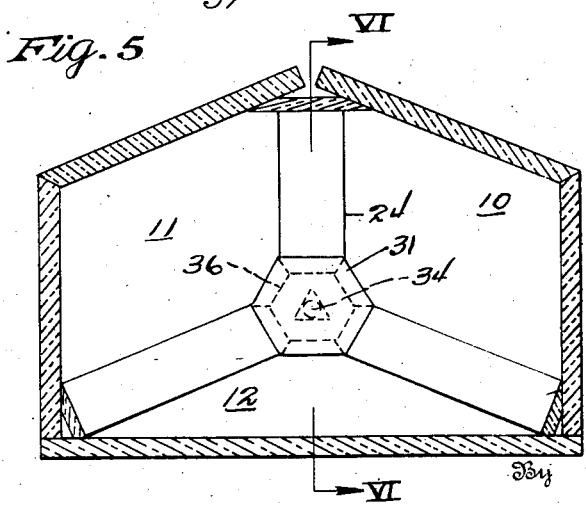
Fig. 5 is a fragmentary perspective view of the corner at the junction between the bottom and two contiguous side walls of the tank.

As shown in Figs. 5 and 6, the horizontal angles of the tank may also be sealed by means of similar sealing strips 28. The three angles coming together in an apex are sealed by means of a rosette-like device which may be triangular or hexagonal, though for purposes of representation it is shown as a hexagon 31, which in section, as shown in Figs. 7 and 8, is a truncated pyramid. This element may be pressed roughly to form from glass and then accurately ground or it may be a section of a relatively thick plate appropriately cut and accurately ground to fit with corresponding ground edges of the sealing strips 24 and 28.

In maintaining strips 24, 28 and the rosette 31 in position, reliance is placed at least in part upon the hydrostatic pressure exerted against the faces thereof. However, if desired additional securing means may be employed. For example, the rosette 31 may be formed with a screw threaded recess 32, adapted to receive a screw or bolt 34, preferably of wood or reinforced plastic having a considerable degree of resilience. The corners of the plates 10 and 11, as well as the bottom plate 12 at their common juncture, are clipped off to provide a bearing surface upon which a triangular bearing plate 36 is adapted to rest. This plate is bored to receive the lower extremity of the screw 34 and, as shown in Fig. 6, a resilient gasket 37 of fiber or the like is disposed between the plate 36 and head 38 of the bolt, in order to give a greater degree of resilience in the construction.

As best shown in Figs. 5 and 6, the beveled edge portions of the rosette 31, when the latter is drawn outwardly by the screw 34, are pressed firmly into engagement with the corresponding edges of the sealing strips 24 and 28, thus securing the latter in position and also causing them to be pressed against the contiguous faces of the side walls 10 and 11.

In order to secure the upper extremities of the vertical sealing strips 24, suitable clamping devices may be employed if so desired. For purposes of illustration the construction best illustrated in Figs. 3 and 4 may be employed. In this construction the strips 24 project slightly above the upper edges of the side walls between diagonally disposed spaced tie bars 39 and 41, which are secured to the upper extremities of the columns 14. These bars function to secure the columns more firmly in position. Suitable wedges 42 are forced between the bar 39 and the inner face of the strip 24 in such manner as firmly to force the beveled edges of the latter into engagement with the glass walls 10 and 11.

The construction shown is strong and simple and at the same time it requires a minimum of metallic parts. Furthermore no metals or easily corrodible substances are exposed to the action of the contents of the container.

The forms of the invention herein shown and described are to be considered merely as representative. It will be apparent to those skilled in the art that numerous modifications may be made therein without departure from the spirit of the invention or the scope of the appended claims.

What I claim is:

1. A container construction comprising plates of glass constituting side walls, said plates being disposed in a supporting framework, screws extending through the framework and engaging the outer faces of the plates constituting the side walls whereby the position of the plates can be accurately adjusted and sealing strips for the angles between the plates, said sealing strips comprising narrow glass bars having the edges thereof accurately beveled to fit the contiguous faces of the glass plates, the beveled edges constituting the bearing surfaces of the strips, said sealing strips being held in position at least in part by hydrostatic pressure of liquids in the container.

2. A container construction comprising glass plates arranged to constitute side walls and a bottom for the container, a framework surrounding the container and comprising vertical columns, screws extending through the vertical columns and having tips engaging the glass plates in order accurately to adjust the positions of the latter, the vertical edges of the vertical plates being in non-abutting relationship, sealing strips for the angles between the plates, said sealing strips comprising bars of glass having their edges accurately ground to fit the contiguous faces of the glass plates, the ground edges constituting the bearing surfaces of the strips.

3. A container comprising plates of glass disposed in angular relation to each other constituting the walls of the container, said plates being disposed in a supporting framework, sealing strips for the angles between the plates comprising narrow glass plates having the edges thereof accurately beveled to fit the contiguous faces of the glass plates constituting the side walls, the beveled edges constituting the bearing surfaces of the strips and means engaging the outer faces of the plates constituting the side walls and being operable to move each wall with respect to the framework, said means being operative to admit of movement of the wall inwardly or outwardly in a direction normal to the wall and without disturbing the position of the remaining walls.

ELMER J. BALLINTINE.